United States Patent Office 2,974,016
Patented Mar. 7, 1961

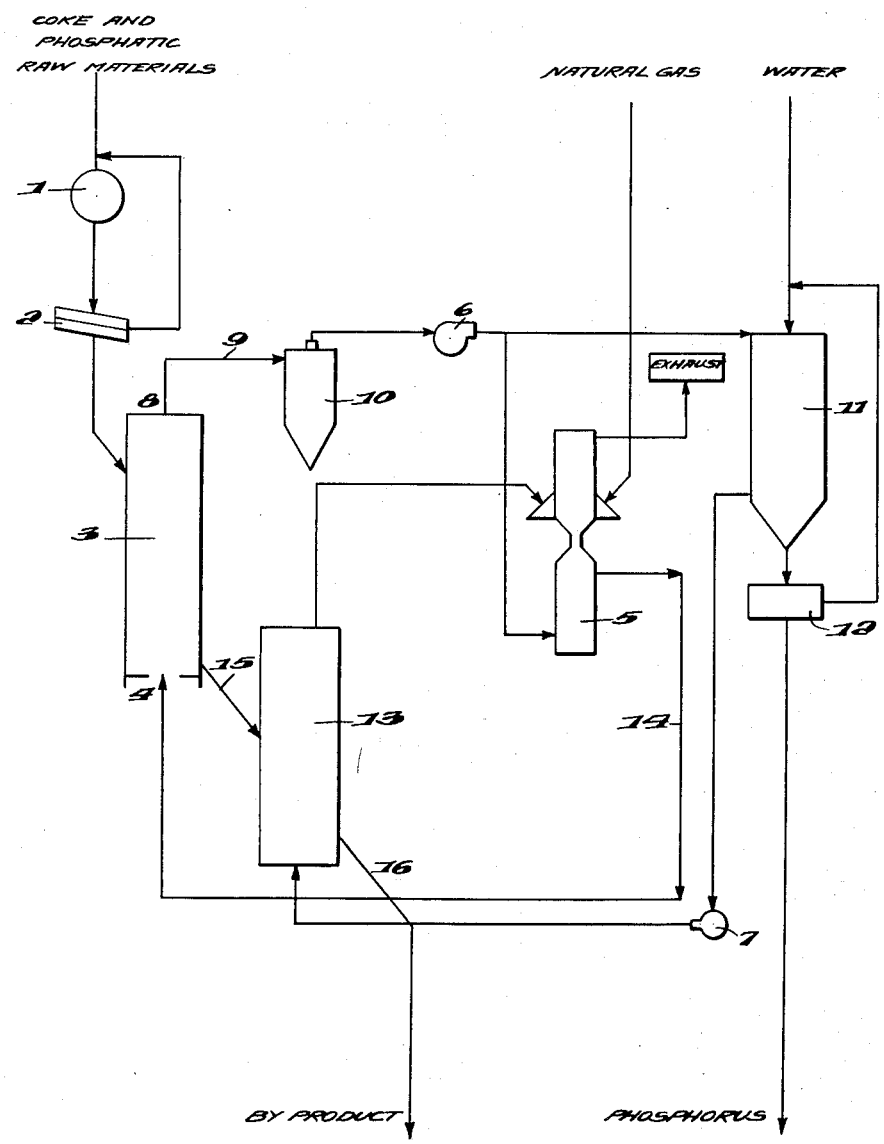

2,974,016
PROCESS FOR THE PRODUCTION OF PHOSPHORUS

John Perrine Horton, Maplewood, N.J., and Brooks Morris Whitehurst, Richmond, Va., assignors to Virginia-Carolina Chemical Corporation, Richmond, Va., a corporation of Virginia Filed June 27, 1957, Ser. No. 668,397

4 Claims. (Cl. 23—223)

This invention relates to the production of phosphorus from phosphatic materials. The invention relates further to a new and improved method for obtaining phosphorus from phosphatic materials. More specifically, the invention is concerned with the production of phosphorus from phosphate rock and other phosphorus-containing materials associated with the phosphate rock mining industry which have previously been discarded because of their inoperability in the conventional methods for production of phosphorus. The invention is further concerned with an entirely new process which utilizes phosphate rock and/or the above named discarded materials.

It is an object of the invention to produce phosphorus in a more economical manner than conventional processes. It is an object of the invention to provide further economies through the use of previously discarded materials. It is an object of the invention to provide a valuable by-product in the production of phosphorus. It is a further object of the invention to provide a new method for production of phosphorus.

This new method for the production of phosphorus is carried out by what is known as a fluidized bed technique, i.e., the reduction of the phosphatic material takes place in a fluidized bed reactor. A fluidized bed is best described as being composed of small particles which are suspended by a current of gas flowing at such a rate as to cause the particles to remain suspended in the gas. The bed of particles may be caused to move upward or downward merely by increasing or decreasing the velocity of the suspending gas. In such a system a solid-gas reaction may take place or a solid-solid reaction may take place.

The application of this technique to the production of phosphorus is best understood by reference to the accompanying drawing which is a flow diagram of the whole process in highly simplified form.

The raw materials, i.e., phosphatic material and carbon, e.g. coke, are first ground in, for example, ball mills 1. The ground materials then pass through screens 2 which allow only proper size materials to enter the fluidized bed reactor 3. Of course, the ratio of carbon to phosphatic material is controlled and changed as the need arises, but provisions for this are not shown in the flow diagram. The fluidization gases pass through the inlet 4 at the bottom of the reactor, having been brought to the correct temperature by the heater 5 and to the correct velocity by compressor 6. As the gases pass up through the reactor 3 and emerge at outlet 8, they heat the bed of particles in the reactor 3 and the phosphorus is vaporized and evolved in the gas stream passing through the conduit 9. This gas stream is fed into the multiple cyclone 10 to remove any dust which might have been entrained. From the multiple cyclone, after the dust has been removed, the gas stream is fed into a compressor 6. At this point a portion of the gas is bled off and led into the phosphorus condenser 11 where it is scrubbed with water. The phosphorus is condensed and flowed with the water into the sump 12, where it is separated from the water. The remainder of the gas from the compressor 6 is fed into the heater 5. The gases separated from the condensed phosphorus are led into the compressor 7 and forced through the heat economizer 13. These heated gases are then fed into the heater 5 and burned to provide heat for the remaining portion of the gases from the compressor 6. The heated gases pass through the conduit 14 and are fed into the inlet 4 of the fluidized bed reactor 3 and provide the means for heating and fluidization of the particles. Supplemental heat for the process is supplied by natural gas which is burned in the heater 5. After the phosphorus has volatilized from the phosphatic material in the reactor 3, the remaining material, as indicated by the arrow 15, is fed into the heat economizer 13, gives up its heat to the recycled gases, and emerges at 16 as by-product material.

The reactions that may take place in the reactor are not yet fully understood. However, the following equations give a reasonable interpretation to the process:

(1)
$$Ca_3(PO_4)_2 + 3SiO_2 + 5C \xrightarrow{\Delta} \tfrac{1}{2}P_4\uparrow + 3CaSiO_3 + 5CO\uparrow$$

(2)
$$2Ca_3(PO_4)_2 + 6Al_2O_3 + 10C \xrightarrow{\Delta} P_4\uparrow + 6CaAl_2O_4 + 10CO\uparrow$$

(3)
$$Ca_3(PO_4)_2 + 5C \xrightarrow{\Delta} \tfrac{1}{2}P_4\uparrow + 3CaO + 5CO\uparrow$$

(4)
$$Fe_2O_3 + 3C \xrightarrow{\Delta} 2Fe + 3CO\uparrow$$

(5)
$$2AlPO_4 + 5C \xrightarrow{\Delta} \tfrac{1}{2}P_4\uparrow + Al_2O_3 + 5CO\uparrow$$

The composition of the raw material feed may be varied. For example, phosphate rock that has had no prior treatment may be used; or defluorinated phosphate rock may be used. Further, material known in the art as "leached zone," which is high in aluminum content, may be used alone or in varying proportions with phosphate rock. The amount of carbon must be at least equivalent to that theoretically required by the composition of the phosphatic material for reaction.

As the composition of the raw material supply is varied, the composition of the by-product varies. If the proportion of aluminum-containing phosphatic material is high, the by-product is also high in aluminum content and is suitable for use as a high alumina cement. The composition of the raw material supply, i.e., the ratio of phosphate rock to "leached zone" is determined by the desired aluminum content of the by-product cement. It is also possible to produce a lower aluminum cement by lowering the amount of aluminum-containing material in the raw material supply.

As stated above, the reaction takes place in a fluidized bed reactor. However, it does not appear to be absolutely necessary that the bed of materials have all the characteristics of a fluidized bed of solids. Generally, no liquid phase can be tolerated in a fluidized bed. But it is believed that some molten material will be present in the operation of our process, especially when higher temperatures are used. But this does not in any way effect the reaction as shown in the accompanying flow diagram. The high velocity gases can be introduced into molten material near the bottom of the reactor, by the use of tuyeres. The gases then flow up through a fluidized bed of unmolten material and out of the reactor as shown. Their composition will be substantially the same whether the material is molten or not.

Practically all of the gas coming from the reactor 3, exclusive of the phosphorus, is carbon monoxide. A part of this gas is separated from the phosphorus in the condenser 11. It then goes through the heat economizer 13 where it is heated by the hot by-product and is then burned in the heater 5 along with the auxiliary fuel supply of natural gas. The remainder of the gas is reheated and forced through the reactor as shown in the diagram.

It is contemplated that the heater can use any source of heat and the use of burning natural gas is given only as an example. Another source of heat might be an atomic reactor through which the gases would be circulated. With this type of heat it is contemplated that the carbon monoxide coming from the condenser would still be burned for its heat value.

The feature that involves the bleeding off of a portion of the gases from the reactor and recirculating the remainder is very important to the process. The phosphorus content of the recirculated gases is at a high percentage and the recovery of phosphorus per cubic foot of gas is high. This is in contrast to the blast furnace process wherein diluent gases are introduced into the system and the phosphorus content is very low, making recovery difficult. Further, the heat economies made by recirculating a major portion of the gases are of great value.

The optimum temperatures for the operation of the process have not been determined. However, the following calculations have been made based on the expected heat requirements of the system.

| Assumed Inlet Gas Temperature, ° F. | Gas Recirculated per lb. of Phosphorus Produced | | Calculated Outlet Gas Temperature, ° F. |
|---|---|---|---|
| | Wt. in Lbs. | Vol. in cu. ft. at Outlet Temperature | |
| 4,740 | 15.5 | 297 | 500 |
| 4,390 | 18.5 | 465 | 800 |
| 3,930 | 24.6 | 814 | 1,200 |
| 3,440 | 37.0 | 1,520 | 1,600 |
| 3,000 | 67.0 | 3,180 | 1,925 |
| 2,600 | 201.0 | 10,900 | 2,253 |
| 2,400 | INF | INF | 2,400 |

It thus appears that operation of the process will have to be at least somewhat above 2400° F. It is known that the temperature required for reducing phosphatic ores to phosphorus is approximately 2400° F. However, the total heat requirement for each pound of phosphorus made is approximately 17,200 B.t.u. About 58% of this heat is required as heat of reaction. The remaining 42% is needed as sensible heat to raise the reactants to the temperature where reaction can take place. Thus, the higher the inlet temperature of the gases, the less is the amount of recirculated gas required to bring the materials to the temperature of reaction.

Practically all of the equipment used in carrying out our process is of known or standard design. What we consider to be new is the application of the described process in the production of phosphorus alone or in the simultaneous production of phosphorus and hydraulic cement material.

We claim:

1. Process for the production of phosphorus which comprises contacting a gas consisting essentially of carbon monoxide and phosphorus, preheated to a temperature above 2400° F., with a fluidized bed consisting of a fluent mixture of finely divided phosphatic material and finely divided carbonaceous material and recovering phosphorus from the resulting gases, the preheated gas being the sole supply of heat to said bed.

2. Process as defined in claim 1 in which the gas stream leaving the fluidized bed is divided into two parts, one of said parts being reheated and returned directly to the fluidized bed and the other part being separated from its phosphorus content and then burned and thus used for reheating said one part.

3. Process as defined in claim 1 in which the phosphatic material comprises leached zone material.

4. Process as defined in claim 1 in which a mixture of carbonaceous material and phosphatic material is continuously supplied to said fluidized bed and in which by-product in solid form is continuously withdrawn therefrom.

References Cited in the file of this patent

UNITED STATES PATENTS

| | | |
|---|---|---|
| 1,441,573 | Franchot et al. | Jan. 9, 1923 |
| 1,841,071 | Waggaman et al. | Jan. 12, 1932 |
| 2,512,076 | Singh | June 20, 1950 |
| 2,829,031 | Reeve | Apr. 1, 1958 |
| 2,897,057 | Burgess | July 28, 1959 |

OTHER REFERENCES

Chemical Engineering, vol. 60, No. 5, May 1953, pages 219–31 and 187–192.